US012136200B2

(12) United States Patent
Gopalkrishna et al.

(10) Patent No.: US 12,136,200 B2
(45) Date of Patent: Nov. 5, 2024

(54) METHOD AND SYSTEM FOR REPLACING SCENE TEXT IN A VIDEO SEQUENCE

(71) Applicant: CareAR Holdings LLC, Norwalk, CT (US)

(72) Inventors: Vijay Kumar Baikampady Gopalkrishna, Santa Clara, CA (US); Raja Bala, Pittsford, NY (US)

(73) Assignee: CareAR Holdings LLC, Norwalk, CT (US)

( * ) Notice: Subject to any disclaimer, the term of this patent is extended or adjusted under 35 U.S.C. 154(b) by 253 days.

(21) Appl. No.: 17/363,293

(22) Filed: Jun. 30, 2021

(65) Prior Publication Data
US 2023/0005108 A1   Jan. 5, 2023

(51) Int. Cl.
*G06T 5/77*     (2024.01)
*G06T 5/73*     (2024.01)
*G06T 7/194*    (2017.01)
*G06T 7/30*     (2017.01)
*G06V 20/62*    (2022.01)
(Continued)

(52) U.S. Cl.
CPC ............... *G06T 5/77* (2024.01); *G06T 5/73* (2024.01); *G06T 7/194* (2017.01); *G06T 7/30* (2017.01); *G06V 20/63* (2022.01); *H04N 5/272* (2013.01); *G06T 2207/10016* (2013.01);
(Continued)

(58) Field of Classification Search
CPC ......... G06T 5/005; G06T 5/003; G06T 7/194; G06T 7/30; G06T 2207/10016; G06T 2207/20081; G06T 2207/20201; G06T 2207/30168; G06T 5/50;
(Continued)

(56) References Cited

U.S. PATENT DOCUMENTS 9,014,255 B2    4/2015  Schweid et al.
9,042,649 B2    5/2015  Tian
(Continued)

FOREIGN PATENT DOCUMENTS

DE    102018128531    5/2020
WO    2020038207     2/2020

OTHER PUBLICATIONS

Azadi, S. et al., "Multi-content gan for few-shot font style transfer", IEEE Conf. Comput. Vis. Pattern Recog., 2018.
(Continued)

*Primary Examiner* — Ping Y Hsieh
*Assistant Examiner* — Vaisali Rao Koppolu
(74) *Attorney, Agent, or Firm* — Fox Rothschild LLP

(57) ABSTRACT

To replace text in a digital video image sequence, a system will process frames of the sequence to: define a region of interest (ROI) with original text in each of the frames; use the ROIs to select a reference frame from the sequence; select a target frame from the sequence; determine a transform function between the ROI of the reference frame and the ROI of the target frame; replace the original text in the ROI of the reference frame with replacement text to yield a modified reference frame ROI; and use the transform function to transform the modified reference frame ROI to a modified target frame ROI in which the original text is replaced with the replacement text. The system will then insert the modified target frame ROI into the target frame to produce a modified target frame. This process may repeat for other target frames of the sequence.

21 Claims, 7 Drawing Sheets

(51) Int. Cl.
*H04N 5/272* (2006.01)
*G06V 30/10* (2022.01)

(52) U.S. Cl.
CPC ............... *G06T 2207/20081* (2013.01); *G06T 2207/20201* (2013.01); *G06T 2207/30168* (2013.01); *G06V 30/10* (2022.01)

(58) Field of Classification Search
CPC .......... G06T 2207/20084; G06V 20/63; G06V 30/10; H04N 5/272; H04N 5/2723
See application file for complete search history.

(56) References Cited

U.S. PATENT DOCUMENTS

| | | | |
|---|---|---|---|
| 9,300,840 | B2 | 3/2016 | Hasegawa |
| 10,896,493 | B2* | 1/2021 | Safdarnejad ............... G06T 5/50 |
| 2014/0185104 | A1 | 7/2014 | Hasegawa |
| 2016/0004921 | A1* | 1/2016 | McCarthy ............ G06V 20/635 382/173 |
| 2016/0140701 | A1* | 5/2016 | Angara ................ G06V 10/243 345/618 |
| 2020/0074709 | A1* | 3/2020 | Bhat ..................... G11B 27/031 |
| 2020/0320324 | A1* | 10/2020 | Goncalves ............. G06F 18/22 |
| 2021/0357512 | A1 | 11/2021 | Busila et al. |
| 2022/0292649 | A1* | 9/2022 | Wang ....................... G06T 7/269 |
| 2022/0301118 | A1* | 9/2022 | Frey ........................ G06T 11/60 |

OTHER PUBLICATIONS

Chen, J. et al., "Bilateral Guided Upsampling", ACM Trans. Graph., 35(6), 2016.
Gharbi, M. et al., Deep bilateral learning for real-time image enhancement, ACM Trans. Graph., 36(4), 2017.
Gharbi, M. et al., "Transform Recipes for Efficient Cloud Photo Enhancement", ACM Trans. Graph., 34(6), 2015.
He, K. et al., "Mask R-CNN," Computer Vision Foundation, pp. 2961-2969.
Hu, J. et al., "Image-to-Image Translation with Conditional-GAN," CS230: Deep Learning, Spring 2018, Stanford University, CA.
Kim, D. et al., "Deep Blind Video Decaptioning by Temporal Aggregation and Recurrence," Computer Vision Foundation, pp. 4263-4272.
Liu, G. et al., "Image Inpainting for Irregular Holes Using Partial Convolutions", ECCV 2018.
Nakamura, T., et al., "Scene Text Eraser," arXiv:1705.02772v1 [cs:CV] May 8, 2017.
Roy, P. et al., "STEFANN: Scene Text Editor Using Font Adaptive Neural Network", IEEE Conf. Comput. Vis. Pattern Recog., 2020.
Tursun, O. et al., "MTRNet: A Generic Scene Text Eraser," arXiv:1903.04092v3 [cs.CV] Oct. 22, 2019.
Ulyanov, D., et al., "Deep Image Prior," Computer Vision Foundation, pp. 9446-9454.
Wang, T.C. et al., "High-Resolution Image Synthesis and Semantic Manipulation with Conditional GA Ns," arXiv:1711.11585v2 [cs.CV] Aug. 20, 2018.
Wang, T.C. et al., "Video-to-Video Synthesis," arXiv:1808.06601v2 [cs:CV] Dec. 3, 2018.
Wexler, Y. et al., "Space-Time Video Completion," Dept. of Computer Science and Applied Math, The Weizmann Institute of Science, Rehovot, 76100 Israel.
Wu, L. et al., "Editing Text in the Wild", ACM Int. Conf. Multimedia, 2019.
Xu, R. et al., "Deep Flow-Guided Video Inpainting," Computer Vision Foundation, pp. 3723-3732.
Yang, Q. et al., "Swaptext: Image based texts transfer in scenes", IEEE Conf. Comput. Vis. Pattern Recog., 2020.
Yang, S. et al. "Controllable Artistic Text Style Transfer via Shape-Matching GAN", Int. Conf. Comput. Vis., 2019.
Yang, S. et al., "Awesome typography: Statistics-based text effects transfer" IEEE Conf. Comput. Vis. Pattern Recog., 2017.
Yang, S. et al., "TET-GAN: Text Effects Transfer via Stylization and Destylization", AAAI 2019.
Yu, J. et al., "Free-Form Image Inpainting with Gated Convolution", ICCV, arXiv:1806.03589 [cs.CV], 2018.
Yu, J. et al., "Generative Image Inpainting with Contextual Attention," Computer Vision Foundation, pp. 5505-5514.
Zhang, L. et al., "Deep Image Blending", WAVC 2020 paper, IEEE Xplore.
Zhang, S. et al., "EnsNet: Ensconce Text in the Wild," arXiv:1812.00723v1 [cs.CV] Dec. 3, 2018.
Information about Related Patents and Patent Applications, see section 4 of the accompanying Information Disclosure Statement Letter, which concerns Related Patents and Patent Applications.

* cited by examiner

METHOD AND SYSTEM FOR REPLACING SCENE TEXT IN A VIDEO SEQUENCE

BACKGROUND

There are many situations in which the removal of scene text from sequence of video images is desirable. For example, video sequences may contain images of storefronts with names, street signs, license plates, and other scenes that contain text. In some situations, it is desirable to remove the scene text from the video to prevent disclosure of personally identifiable information, such as street names or vehicle plate numbers, to others who view the images. In other situations, it is desirable to remove scene text to avoid creating a video with a logo or product name that conflicts with obligations to advertisers or sponsors of the video. In other situations, it is desirable to remove scene text and replace it with personalized messages or messages that suit the storyline that the video is presenting. Other applications, such as translation of scene text, can also benefit from text removal and replacement processes.

Manual text replacement is very time consuming, and it can be imprecise. Therefore, several automated text replacement methods are known. However, the existing methods often yield results in which the tone or texture of the replacement text is still distinguishable from the original background, and/or results in which the background tone or texture has been altered to match the area around the replacement text.

This is an especially challenging problem in a video sequence, in which text replacement must be performed for a large number of frames. Text replacement can involve several steps including removal of the original text (i.e., background inpainting), estimation of style properties of the original text (such as color, font, texture), and insertion of the new text into the background according to the original text's style. Modern video standards can support frame rates of 120, 240 or 300 frames per second. Even standard definition video, which has a nominal frame rate of 24 frames per second, yields over 86,000 frames in a one-hour video sequence. If all steps required for text replacement are applied to such a large number of frames, a significant amount of processing capacity and time can be required.

In addition, in a video sequence the color appearance of a text object can change from frame to frame due to differences in lighting that is incident on the camera as it captures the scene, camera properties such as color/white balance, changes in focus, camera blur, varying distance between the text and the camera, and other variables. Thus, the results of applying existing text replacement methods to video sequences can be temporally inconsistent.

This document describes methods and systems that are directed to addressing the issues listed above.

SUMMARY

Methods and systems for replacing text and/or other objects in digital image sets are disclosed in this document. The system may include a processor and a memory device containing programming instructions that are configured to cause the processor to receive a sequence of digital image frames, and process the digital image frames to define a region of interest (ROI) that contains original text in each of the digital image frames. The system will use the ROIs of the digital image frames to select a reference frame from the sequence of digital image frames. The system also will select a target frame from the sequence of digital image frames, wherein the target frame is different from the reference frame. The system will determine a transform function between the ROI of the reference frame and the ROI of the target frame. The system will replace the original text in the ROI of the reference frame with replacement text to yield a modified reference frame ROI. The system will use the transform function to transform the modified reference frame ROI to a modified target frame ROI in which the original text is replaced with the replacement text. The system will then insert the modified target frame ROI into the target frame to produce a modified target frame. Optionally, instead of scene text, other objects such as images that an object detection and classification system may be replaced in digital image sets using the same processes described in this document, In some embodiments, for each of one or more additional target frames in the sequence, the system may determine an additional transform function between the reference frame ROI and the additional target frame ROI. The system may then use the additional transform function to transform the modified reference frame's ROI to a modified additional target frame's ROI in which the original text is replaced with the replacement text.

In some embodiments, when using the ROIs to select the reference frame, the system may analyze the digital image frames of the sequence to select a frame in which the original text satisfies a function of one or more of the following criteria: a threshold optical character recognition confidence score; a sharpness criterion; a size criterion; a contrast criterion; or a pose criterion.

In some embodiments, to determine the transform function between the reference frame ROI and the target frame ROI, the system may determine at least two of the following: (a) a lighting correction transform element, which comprises a function that represents changes in illumination between the reference frame ROI and the target frame ROI; (b) a sharpness transform element, which comprises a function that represents differences in camera focus, capture resolution, or both between the reference frame ROI and the target frame ROI; or (c) a motion blur transform element, which comprises a function that represents differences in motion blur between the reference frame ROI and the target frame ROI. To determine the lighting correction transform element, the sharpness transform element and/or the motion blur transform element, the system may train a machine learning model using training samples comprising pairs of reference frames and target frames. To use the transform function to transform the modified reference frame ROI to the modified target frame ROI, the system may apply the determined transform elements to the modified reference frame ROI to yield the modified target frame ROI.

In some embodiments, before using the transform function to transform any of the target frame ROIs, the system may normalize and align the original text in the ROIs for each of the target frames to a consistent pose.

In some embodiments, to replace the original text in the reference frame ROI with replacement text to yield the modified reference frame ROI, the system may: (i) process the ROI of the reference frame through a multitask machine learning model to determine a foreground image of the ROI, a background image of the ROI, and a binary mask that distinguishes foreground image pixels from background image pixels in the ROI; (ii) receive a new binary mask that contains replacement text; and (iii) apply the new binary mask to blend the background image with the foreground image and yield a modified reference frame ROI.

In some embodiments, to process the digital image frames to define the ROI in each frame the system may apply a text detector to each of the digital image frames of the input sequence to return bounding box coordinates. The system may then define the ROI of each of the digital image frames according to the bounding box coordinates.

DETAILED DESCRIPTION

Figure 1:
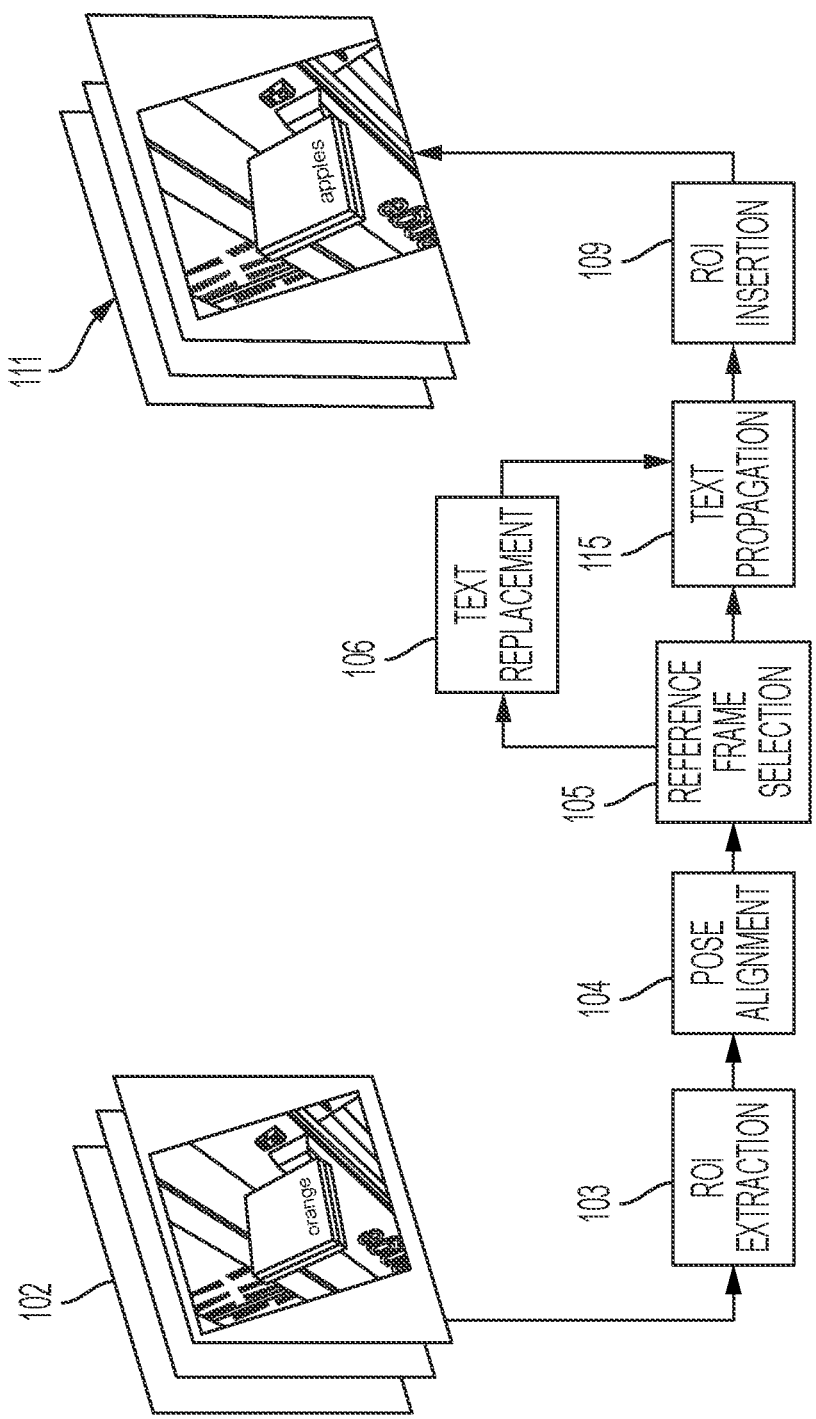
FIG. 1 illustrates an example text replacement process for a video sequence.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another and is not intended to require a sequential order unless specifically stated.

The term "approximately," when used in connection with a numeric value, is intended to include values that are close to, but not exactly, the number. For example, in some embodiments, the term "approximately" may include values that are within +/-10 percent of the value.

In this document, the term "substantially every", when referring to a particular parameter, means that a great majority of the instances or values such parameters will satisfy a condition. In various embodiments, the majority may be at least 80%, at least 85%, at least 90%, or at least 95% of the parameters.

In this document, the term "text" will be used to refer to a sequence of one or more characters, and it may include alphanumeric characters such as letters and numbers, characters that represent words or portions of words in various languages such as kanji and hanzi, as well as punctuation marks, mathematical symbols, emojis, and other symbols.

Additional terms that are relevant to this disclosure will be defined at the end of this Detailed Description section.

As noted in the Background section above, the removal of scene text from digital images is sometimes referred to as "text infilling" or "text inpainting". There are several known methods of text infilling, including methods that are based on principles of deep style transfer.

To address the problems of the prior art described above, this document describes a novel method of applying text replacement to a digital image or a video sequence of digital image frames. The process may be understood as including four general steps: In one step, text in all frames of the sequence is normalized to a frontal pose. In another step, a reference frame is selected from the video sequence. In another step, the original text of the reference frame is replaced with new text using any suitable text infilling process. Then, after the three steps above are performed, then instead of applying the same text replacement process to the remaining frames of the video sequence, a novel pairwise image transformation network is used to transfer the new text is transferred to the remaining frames. This approach disentangles style transfer from geometric and photometric variations encountered in video, and it applies temporal consistency restraints to yield results of good quality, with less processing time and resources than would be required by traditional frame-by-frame text infilling processes.

Figure 2:
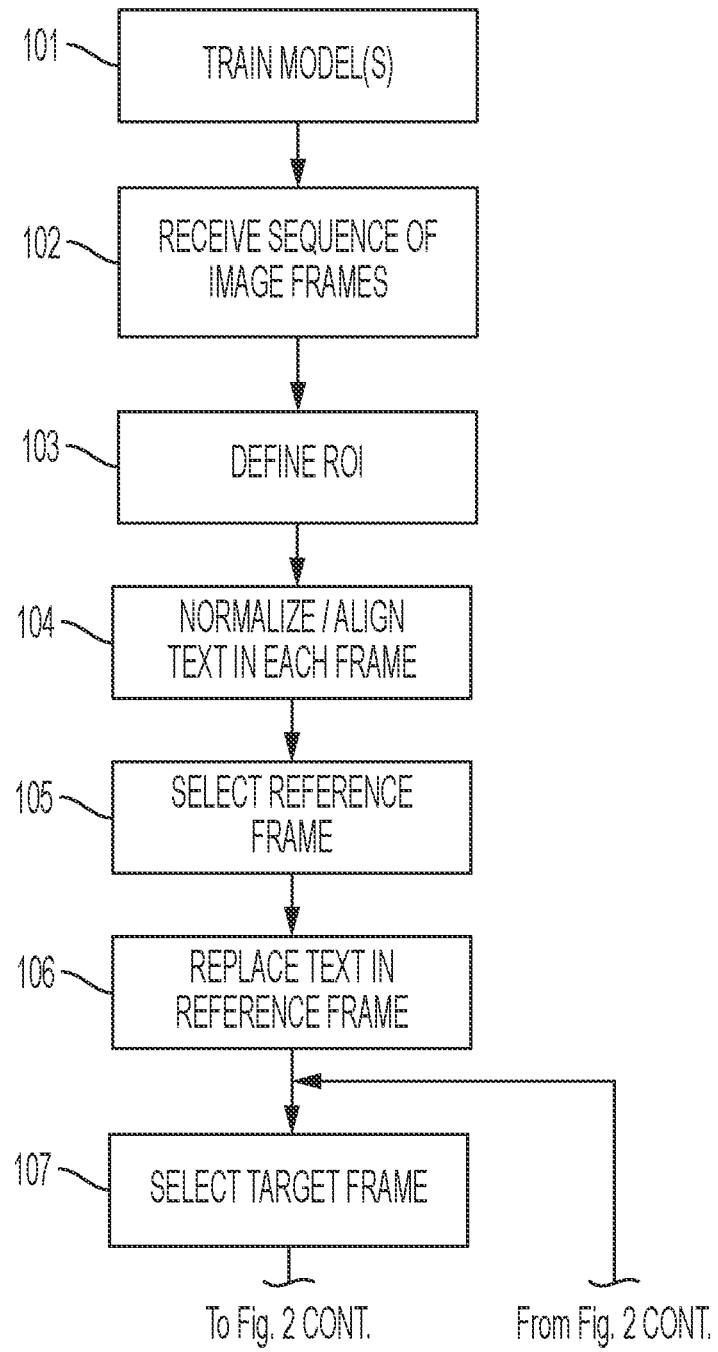
FIG. 2 illustrates the steps of FIG. 1 in flowchart format.
Figure 2:
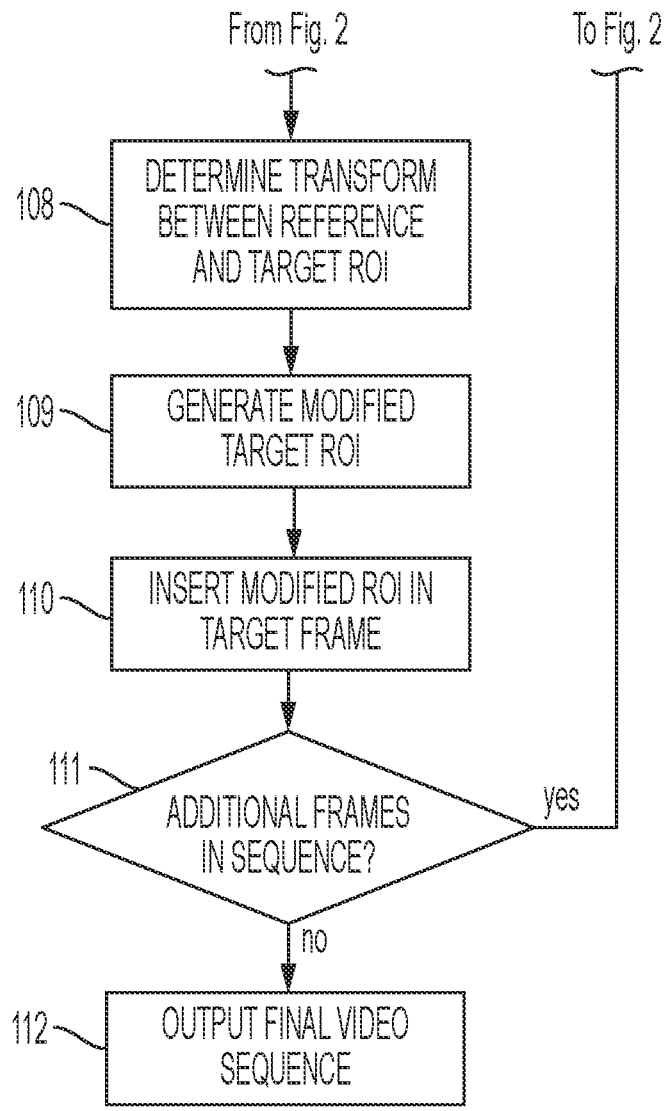

Certain elements of this workflow are shown in FIG. 1. FIG. 2 illustrates the steps of FIG. 1 in flowchart format, with some additional details that are not shown in FIG. 1. At 102, an image processing system that includes a processor and programming instructions will receive a video that includes a sequence of digital image frames. FIG. 1 illustrates this by way of example in which the image frames include a sign on which the word "orange" appears.

At 103 the system will identify and extract a region of interest (ROI) from each of the image frames. The ROI in each frame will include text that is to be replaced. To extract the ROI, the image frames received at step 102 may be pre-processed, in that they have been cropped to define the ROI. Alternatively, then at 103 the system may process the image frames with a text detector that returns bounding box coordinates for cropping the text ROI in each frame. A text detector is a set of programming instructions that a computing device uses to process an image with a feature detector such as the tesseract algorithm, a maximally stable extremal regions (MSER) algorithm detector, a convolutional neural network (CNN) or any now or hereafter known optical character recognition (OCR) process.

Text objects in videos can undergo diverse geometric distortions from frame to frame due to variations in the object pose relative to the position of the camera that captured the video. To reduce the effect of this distortion on text style transfer, at 104 the system may normalize and align the source text in all ROIs to a canonical frontal pose before beginning text replacement operations. This enables both robust text style transfer on the reference frame, and the propagation of the replaced text onto the remaining frames via learned image transforms. In step 104 the system may use an algorithm that makes a simplifying assumption that the scene text is on a planar surface. This covers many common cases such as street and store signage, banners, and the like. Under the planar assumption, pose correction is accomplished via a perspective transform. The system may do this via a machine learning model such as a spatio-temporal transformer network (STTN) that has been trained to perform for perspective correction in videos. A trained STTN predicts the parameters $\theta$ of a geometric correction transform via a localization network, and it applies the transform to the image via grid generation and resampling operators. The STTN may trained as part of a supervised classification task at step 101. Examples of suitable networks include those described in Jaderberg et al., "Spatial Transformer Networks" (arXiv:1506.02025v3 [cs.CV] 2016). The system may use a network architecture similar to that disclosed in the prior art, but it would be trained to produce temporally consistent frontal ROIs. The training samples used to train the STTN may include a set of distorted input ROIs and a frontal ROI of synthetic text serving as the target label. The network is trained on the following loss:

$$L_{STTN} = L_\theta + \lambda_1 L_{pix} + \lambda_2 L_t$$

in which $L_\theta$ is the mean-squared error (MSE) between the true and predicted homography parameter vector $\theta$, and $L_{pix}$ is the pixelwise MSE between predicted and true text ROIs. $L_t$ is the temporal consistency loss, defined as the MSE between $\theta$ for adjacent video frames: $L_t = \Sigma_j |\theta_i - \theta_j|^2$, where index I denotes the current frame and the summation is over a number of neighboring frames in which $j \neq i$. This term improves smoothness in variation of perspective correction parameters over adjacent frames. Alternatively, the normalization step 104 may be done after the reference frame selection step 105, or after the text replacement step 106.

At 105 the system selects a reference frame, and at 106 the system replaces the original text of the reference frame with replacement text. These steps may be performed after the normalization step 104 as shown in FIGS. 1 and 2.

To select the reference frame at 105, the system will analyze frames in the sequence and select one in which the text of the ROI exhibits a suitable appearance and/or geometry. To help ensure a successful style transfer, the source text in the reference frame should be legible, sharp, of high contrast, and maximally frontal in pose. The system may therefore use any or all of the following criteria to determine a frame's suitability for use as a reference frame: a requirement that the ROI in the reference frame have a threshold optical character recognition (OCR) confidence score; and/or a requirement that the ROI satisfy a sharpness criterion, a size criterion, a contrast criterion, and/or a pose criterion.

For example, for a frame to qualify as a reference frame the system may require that the ROI in the reference frame have an OCR confidence score greater than 0.99, or that the reference frame have the highest (or one of the highest) OCR confidence scores of all frames in the sequence. The OCR score may be determined using existing processes such as the Amazon Rekognition image analysis module that is available from Amazon Web Services. Selecting an image with a high OCR score helps to eliminate excessively blurry, distorted or occluded text objects. The system may measure image sharpness of each frame's ROI as, for example, the variance of the Laplacian of the luminance image, and the sharpness criterion may require that the reference frame have one of the n highest sharpness scores of all images in the sequence. To measure contrast of each frame's ROI, the system may binarize the ROI into foreground regions and using Otsu's algorithm (as published in Otsu, "A threshold selection method from gray-level histograms," *IEEE Trans. System. Man. Cybernetics* 9(1):62-22 (1979)), and it may determine the contrast as normalized interclass variance $s_1$ between the foreground and background regions. To estimate frontal pose of the text in each ROI the system may, for example, calculate the frontal pose as the ratio $s_2$ of the area of the ROI's bounding box to the area of a subsuming axis-aligned rectangle. The system may then calculate a composite text quality score for each frame as a function of any or all of these criteria, and it may select the frame with the highest composite text quality score as the reference frame. An example function for determining a composite text quality score is $\alpha_1 s_1 + \alpha_2 s_2$, in which $\alpha_1$ and $\alpha_2$ are heuristically chosen based on visual evaluation of replaced text in random videos.

Figure 3:
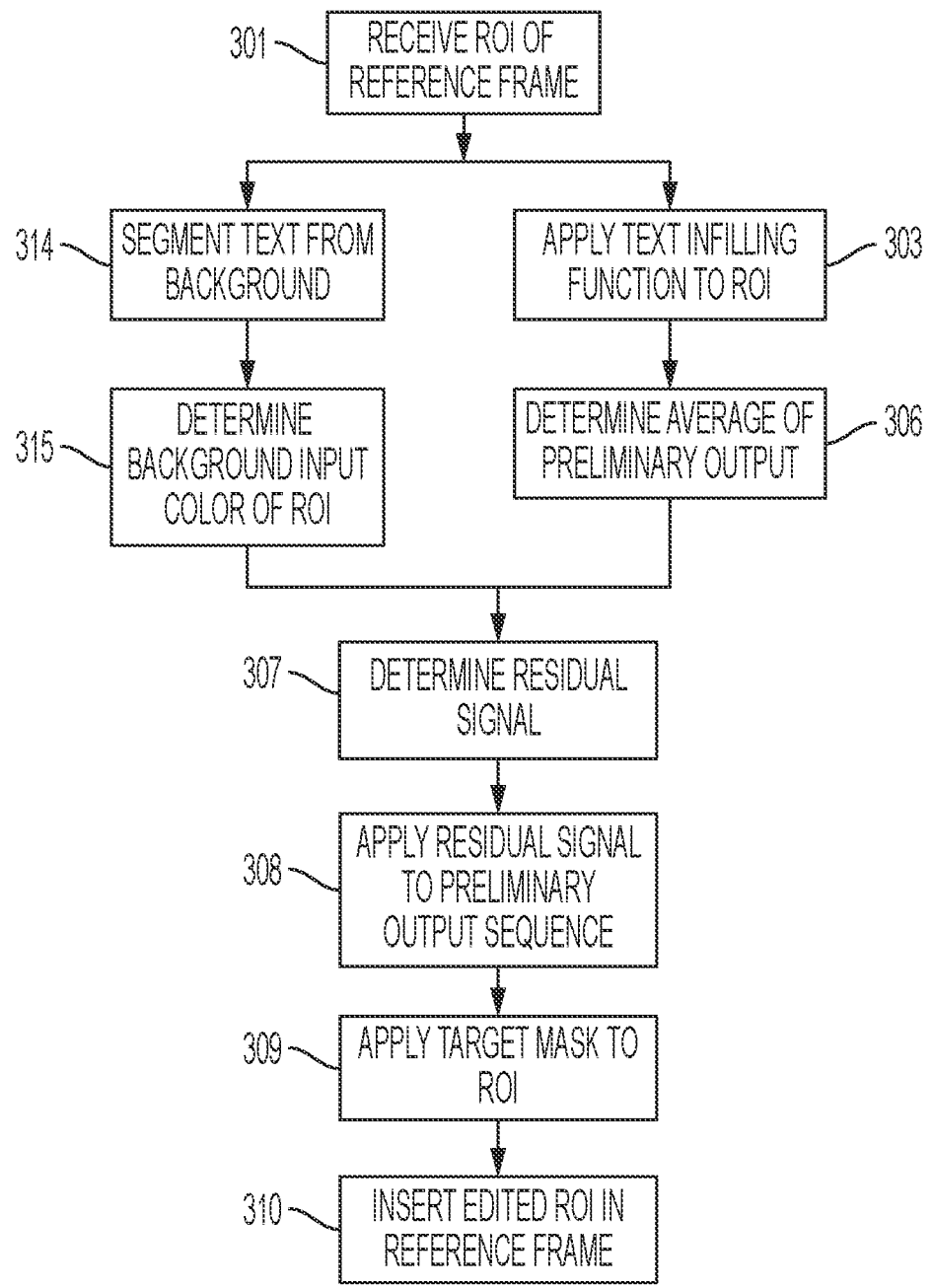
FIG. 3 illustrates an example text infilling process for a reference frame of a video sequence.

As noted above, after the system selects a reference frame at 105, the system will replace the original text of the reference frame with replacement text at 106. An example text replacement process is illustrated in FIG. 3, in which steps 105 and 106 from FIGS. 1 and 2 are consolidated as step 301. The system processes the ROI of the reference frame in two parallel paths. In a first path, at 303 the system will apply a text infilling function to the ROI by processing the reference frame's ROI and modifying text-containing pixels in the ROI so that those pixels exhibit a background color of the ROI instead of the text color. In some embodiments, the text infilling function may be the pix2pix model, with the function applied to each image of the sequence, or to a subset of the images in the sequence (such as a group of images over a specified time period, or every other image). The pix2pix model is a model in which conditional generative adversarial network (GAN) transforms a first image to a second image. The pix2pix method is described in numerous publications, including Wang et al., "High Resolution Image Synthesis and Semantic Manipulation with Conditional GANs" (arxiv:1711.11585 [cs.CV], 2018). Alternatively, a style retention network such as that known as SRNet or another GAN may be used to process the image and replace text with background color.

For example, at 303 the vid2vid method of video image synthesis may be used. The vid2vid method is disclosed in, for example, Wang et al., "Video-to-Video Synthesis" (arXiv:1808.06601v2 [cs:CV 2018). After step 303 pixels that were within the ROI will no longer exhibit a color that corresponds to text but instead will exhibit a color that appeared in the background of the ROI. The output of step 303 will be an image frames in which the text pixels have been infilled with the background color.

In a parallel path, at 314 the system will separate foreground (text) from background (non-text) in the ROI. For example, the system may pass the ROI through a foreground-background segmentation module such as Mask-RCNN. The foreground-background segmentation module will generate a binary mask in which each pixel in the ROI is assigned a value of either zero (0) or one (1), wherein one of the values corresponds to foreground (text) and the other value corresponds to background (non-text). Each pixel of the ROI in the original reference image will have a color value, which in an RGB color model will include three channels (i.e., three channels, one for a red component R, one for a blue component G, and one for a blue component B). At 315 the system will then determine an input background color value for each channel in the ROI. For example, if the mask assigns background pixels a mask value of 1, the system may multiply each ROI pixel's color value by its binary mask value, and then determine a mean value of all pixels in each channel for the background of the ROI after the multiplication. Optionally, the input background color may be a weighted average of the pixel values in the ROI. For example, RGB channels may be given equal weights, but other channels that use characteristics such as luminance and chrominance, the luminance channel may be given more weight than that of the chrominance channel.

At 306 the system will also determine, for each color channel, an average of the color values of all pixels in the preliminary output of the text infilling function. As with step 315, the average of step 306 may actually be a mean, or a weighted average. At 307 the system will then compare the color value of each channel returned at step 306 to the color value of each corresponding channel returned at step 315 to generate a residual signal. The residual signal will be a C-dimensional vector, in which C represents the number of output channels of the network. The value of each channel in the residual signal may be a positive number or a negative number, depending on the results of the comparing step 317.

At 308 the residual signal is applied to the preliminary output set so that, for each pixel in the ROI of the preliminary output signal, the color value for each channel of the pixel is summed with the corresponding value of the residual signal for that channel.

At 309 a target mask that is a binary mask with replacement text may then be blended (using a foreground color) with the blank reference frame to yield the modified reference frame with replacement text. The blending process may be performed by simple binary switching, in which background pixels of the target mask are assigned color values of the predicted background image while foreground pixels of the target mask are assigned color values of the predicted foreground image. Alternatively, the blending may be performed using any now or hereafter known blending process such as those that use a generative adversarial network. (See, for example, Zhang et. Al., "Deep Image Blending", arXiv: 1910.11495 [cs.cv] 2020.) In the process described above, "color" has been described as a single value for the purpose of describing the process. However, in practice, each pixel of the ROI will have a color value in an RGB color model, which means that the color value will include three channels (one for a red component R, one for a blue component G, and one for a blue component B). Pixels may include additional channels for additional characteristics, such as luminance or chrominance. Thus, the process described above may be performed for each available channel. In such situations, the average foreground color, average background color, and residual signal will be C-dimensional vectors, in which C represents the number of available channels of the network. When determining averages, or when adding or blending, some channels may be given different weights than others. For example, the system may assign equal weights to RGB channels, but other channels such as those for characteristics such as luminance and chrominance may have unequal weights in various processes.

Alternatively a number of state of art methods may be used for replacing text in the reference frame, including SR-Net (include reference).

The process above yields a final edited ROI, which may be applied to the input video frame at 310 as a replacement ROI, thus resulting in a blank reference frame.

Returning to FIGS. 1 and 2, after the text replacement in the reference frame is complete at 106, the system will propagate that text replacement to other frames in the sequence at 115. The text propagation step 115 of FIG. 1 includes several sub-steps, including (as shown in FIG. 2) determining a transform function between the ROI of the reference frame and the ROIs of each target frame at 108, and using the transform function to transform generate a modified target frame ROI at 109 by transforming the modified reference frame ROI into the modified target frame ROI. The system will then insert the modified target frame ROI into the ROI at 110.

To insert the modified target frame ROI into the ROI at 110, the system then applies the ROI to an encoder of a neural network or other machine learning model which converts the ROI image into a format that the network may then process, such as a multidimensional tensor. The encoder may be a single, deep neural encoder that is shared by multiple decoders. The output of the encoder is then simultaneously passed to three decoders: a foreground image decoder, a background image decoder, and a binary image decoder, which perform a parallel process to simultaneously predict the three constituent image that make up the single ROI input. Optionally, some or all of the decoders may be deep neural network decoders. The foreground image decoder of the neural network will predict a foreground image of the ROI, in which the foreground image includes color values for the text of the ROI. The background image decoder of the network will determine a background image of the ROI, in which the background image includes color values for areas of the ROI that do not contain the text of the ROI. The binary mask decoder of the network will predict a binary mask that distinguishes the foreground pixels from the background pixels by assigning each pixel a value of either 0 or 1, or by predicting the probability of each pixel being a foreground color, taking on values between 0 and 1. This probability map is then converted to a binary mask with a suitable thresholding operator. In the binary mask, foreground pixels have a value of 1 while background pixels have a value of 0, but in practice this assignment could also be reversed such that foreground pixels have a value of 0 while background pixels have a value of 1. To reduce errors, a residual post-correction step may be used. In residual post-correction the system applies the binary mask to the input ROI to extract the average color of the input foreground pixels and the average color of the input background pixels, respectively. The system may use the binary mask to extract a foreground average color by averaging the color values of pixels of the input image that correspond to foreground pixels in the mask. Similarly, the system may use the binary mask to extract a background average color by averaging the color values of input image pixels that correspond to background pixels in the mask. Optionally, the average value may be a weighted average. If the mask is a continuous-valued map indicating probability of foreground, then these probabilities are treated as foreground weights. A weighted foreground average may be computed by performing pixelwise multiplication of foreground weights and foreground colors, summing the products, and dividing by the sum of foreground weights. The process is repeated to compute a weighted background average, except that background weight is computed as 1−{foreground weight}. Next the system determines an average predicted background color from the output image predicted by the background decoder using the same set of steps described above. This average predicted background color is subtracted channelwise for each of R, G, B from the average input background color to form a residual correction signal [$\Delta R, \Delta G, \Delta B$]. The system will then add the residual signal to substantially every pixel of the predicted background image. This will result in a predicted background image in which pixels of the ROI that contain text have been infilled with the predicted background color. The system will add the average input foreground color computed from the input ROI to substantially every pixel in the predicted foreground image. This will result in a corrected foreground image in which pixels of the ROI that do not contain text have been infilled with the predicted foreground color.

Step 111 indicates that this process will repeat until the replacement text has been propagated to all other target frames in the video. Upon completion the system will output a final video sequence with the modified target frames at 112. Accordingly, rather than repeatedly performing text replacement on every frame of the video, the system will instead learn changes in text appearance over the frames of the video, and it will use the transform to propagate the edits that it applies to the reference frame to some or all of the other frames in the video.

The transform function may be a function that includes two or more of the following elements: (a) a lighting correction transform element, which includes a function that represents changes in illumination between the ROI of the reference frame and that of the target frame; (b) a sharpness transform element, which includes a function that represents differences in camera focus, capture resolution, or both between the ROI of the reference frame and that of the target frame; and/or (c) a motion blur transform element, which includes a function that represents differences in motion blur between the ROI of the reference frame and that of the target frame. These and/or other elements of the transform function may be determined by training a machine learning model on pairs of reference frames and target frames.

Figure 4:
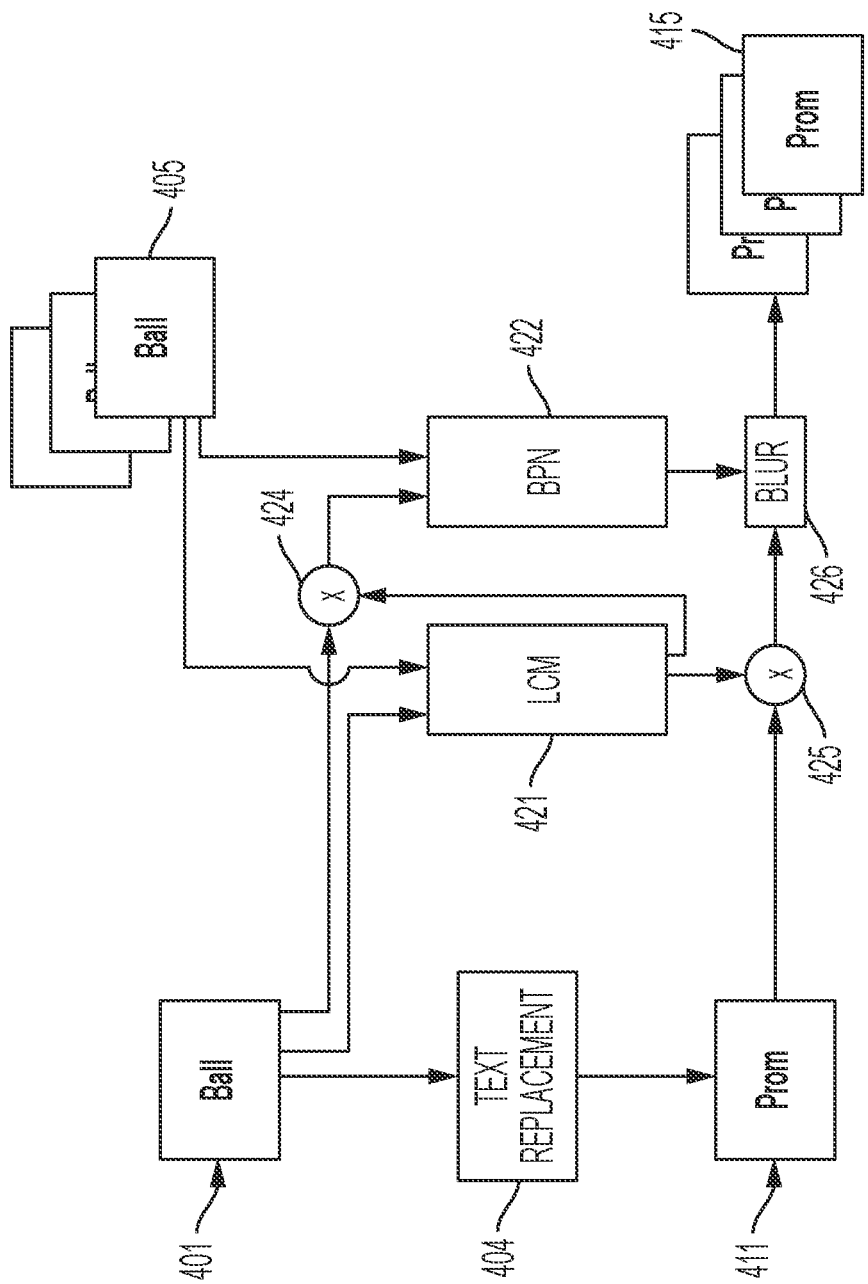
FIG. 4 illustrates an example text propagation process according to the present disclosure.

FIG. 4 illustrates example machine learning models that the system's text propagation module may employ. The module's design presumes that image transformation between two video frames within a ROI can be adequately modeled in terms of simple parametric changes in lighting and image sharpness due to changes in camera, target object, and/or lighting conditions over a sequence of frames. The system may use self-supervision to learn the parameters of the model without relying on a large set of paired videos and labels. For the purpose of this discussion, consider $I_R$ 401 and $I_i$ 405 respectively to be the ROIs from the reference frame and the $i^{th}$ additional frame in the input video. Similarly let $I_R'$ 411 and $I_i'$ 415 be corresponding ROIs of the target text in the modified reference frame and the modified additional frame in the output video. The ROIs may be normalized (pose-corrected) and aligned by a pose alignment module such as the STTN as discussed above in the context of FIGS. 1 and 2. The system uses a text replacement process 404 such as those described above to modify the original reference frame $I_R$401 and yield the modified reference frame $I_R'$ 411.

The system learns a parametric transform between the ROI of original reference frame $I_R$ 401 and the ROIs of each additional target frame 405 of the video in which text is to be edited. For each target frame, the system then applies the target frame's transform to the modified reference frame $I_R'$ 411 to predict the modified target frame's ROI. The transform may include at two of the following stages, a lighting correction module (LCM) 421, a differential blur prediction network (BPN) 422 as shown in FIG. 3.

The LCM 421 captures appearance differences between the reference image ROI 401 and the target image ROI 405 due to changes in illumination, including shadows and shading. Since the color of an object is a product of its reflectance and the illumination, the system may presume that changes in light reflected off a fixed text object can be modeled by independent channel-wise scaling of R, G, and B channels in a spatially varying manner. In particular, changes in lighting between two aligned ROIs can be obtained from their ratio $I_R/I_i$ which is then multiplied (at 425) by $I_R'$ 411 as part of the transform function to obtain the lighting-corrected output for $I_i'$ 415. In practice, the ratio $I_R/I_i$ may produce sharp discontinuities at the text boundaries. To avoid this, the system first removes the text in $I_R$ and $I_i$ via text inpainting (see FIG. 3) and then computes ratios of the inpainted versions. An implicit assumption with the ratio model is that the reflective properties of the foreground text and background in any ROI are similar. Further, to ensure temporal robustness the system may compute a weighted average of inpainted ROIs over N neighboring frames in the vicinity of $I_i$ before computing the ratio. The latter may then be multiplied by both the original reference frame $I_R$ 401 (at 424) and the modified reference frame $I_R'$ 411 (at 425) to produce lighting-corrected versions that are then passed to the BPN 422.

Blur prediction by the BPN 422 may be a CNN-based method for predicting a transformation between a pair of images that can result from spatial aberrations, including motion blur, out-of-focus blur, and resolution differences due to varying distances between camera and text object. The system may identify differences in blur at a first order by spatial filtering. In addition or alternatively, the system model possible frame-to-frame distortions within a frame's text ROI using the following transformation:

$$I_i(x,y)=(1+w)I_R(x,y)-wI_R(x,y)*G_{\sigma,\rho}(x,y) \quad \text{(Equation 1)},$$

where $w \in [-1, 1]$ and $G_{\sigma,\rho}$ is an oriented 2D Gaussian filter rotated by angle $\rho$:

$$G_{\sigma,\rho}(x,y) = Ke^{-\left(\frac{x'^2}{\sigma_x^2}+\frac{y'^2}{\sigma_y^2}\right)}, \quad \text{(Equation 2)}$$

where K is a normalizing constant, $x'=x \cos \rho + y \sin \rho$ and $y'=-x \cos \rho + y \sin \rho$. The case of $\sigma x \approx \sigma y$ yields an isotropic point spread function (PSF) modeling out-of-focus blur and resolution differences, while a significant difference between these two parameters models an anisotropic blur in direction $\rho$, encountered with typical camera or object motion. As w varies from −1 to 0 to 1, the transformation varies from image sharpening to identity to image blurring. (Image sharpening with w<0 by be done by a sharpness correction module (SCM) if the current frame is sharper than the reference frame. The SCM function may be implemented by the BPN, or it may be a separate function.) BPN takes the reference frame $I_R$ 401 and a sliding window of N frames $I_i$ around the current ($i^{th}$) time instance, and predicts N sets of parameters $\psi=[\sigma_x, \sigma_y, \rho, w]$ that best transforms $I_R$ to the N output frames (with respect to spatial frequency characteristics) via the blur model described above. The network thus may take in N+1 image inputs and predict 4N parameters. Predicting transforms on frame stacks ensures temporal consistency. The network architecture for implementing the BPN 422 and/or SCM may include a ResNet18 backbone, an average pooling layer and two fully connected layers. The training loss for the BPN may be defined as:

$$L_{BPN}=\lambda_\psi L_\psi+\lambda_{RLR}+\lambda_T L_T \quad \text{(Equation 3)},$$

where $L_\psi$ is the squared error loss between the true and predicted parameter vectors $\psi$; $L_R$ is the mean-squared image reconstruction error between the predicted and true ROIs, and $L_T$ is a temporal consistency loss that discourages large fluctuations in $\psi$ over time: $L_T=\Sigma_j |\psi_i - \psi_j|^2$, where i denotes the current frame, the summation is over N−1 neighboring frames, and j≠i. The predicted $I_i$ is obtained by applying the blur model described above with parameters $\psi$ to $I_R$. Note that the blur model is differentiable with respect to w and thus can be applied within a training loop, which will be described below.

The transform function that transforms the modified reference frame 411 into a modified target frame 415 for each target frame therefore may include a ratio image from the LCM at 425, and a set of blur parameters 426.

As noted above in the discussion of FIG. 2, before the text replacement process described above begins, any or all of the networks used by the system will be trained (at 101). The training may be periodically updated or supplemented at any point in time. For example, the BPN may be trained in two stages. In the first stage, Equation 1 above with known parameters $\psi$ may be applied to reference ROIs $I_R$ from synthetic videos to obtain training pairs ($I_R$, $I_i$). As part of augmentation, inputs $I_i$, may be warped with translational jitter in the x and y directions to make the network less prone to minor misalignments between $I_R$ and $I_i$ that may be encountered in real video frames. In the second stage of training, the BPN may be fine-tuned via self-supervision with ($I_R$, $I_i$) tuples extracted from real-world videos. Here, only $L_R$ and $L_T$ are minimized since the true ψ are unknown. During inference, the ROI pair ($I_R$, $I_i$) from the original video is passed through the BPN, and the predicted parameters are used to apply Equation 1 above to the altered ROI $I_R'$ to produce the ROI $I_R'$ for the current ($i^{th}$) frame.

Figure 5:
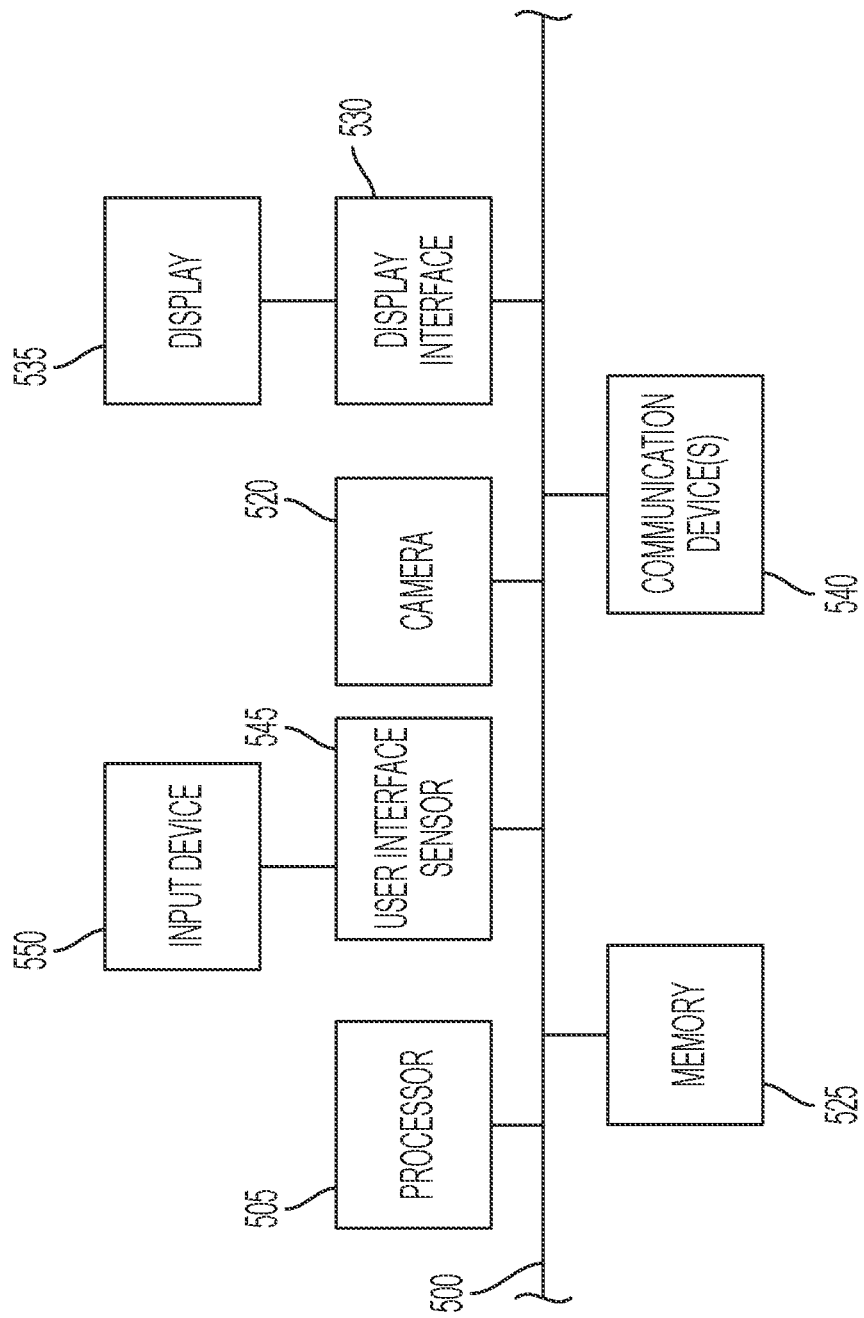
FIG. 5 illustrates example hardware elements of a video processing system.

Thus, during training the system may sample the transform parameters (such as w, σ, length and angle) from corresponding distributions and use a reference frame to generate synthetic modified target frames. The system also may use a pre-trained network and fine-tune it with actual video frames. FIG. 5 depicts an example of internal hardware that may be included in an image processing system, such as a local or remote computing device that processes image frames as described above. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. The programming instructions may be configured to cause the processor to perform any or all of the methods described above. Read only memory (ROM), random access memory (RAM), flash memory, hard drives and other devices capable of storing electronic data constitute examples of memory devices 525. A memory device may include a single device or a collection of devices across which data and/or instructions are stored.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a wireless antenna, a radio frequency identification (RFID) tag and/or short-range or near-field communication transceiver, each of which may optionally communicatively connect with other components of the device via one or more communication system. The communication device 540 may be configured to be communicatively connected to a communications network, such as the Internet, a local area network or a cellular telephone data network.

The hardware may also include a user interface sensor 545 that allows for receipt of data from input devices 550 such as a keyboard, a mouse, a joystick, a touchscreen, a touch pad, a remote control, a pointing device and/or microphone. Such devices may be used to help label images in training the model. Digital image frames also may be received from a camera 520 that can capture video and/or still images.

Figure 6:
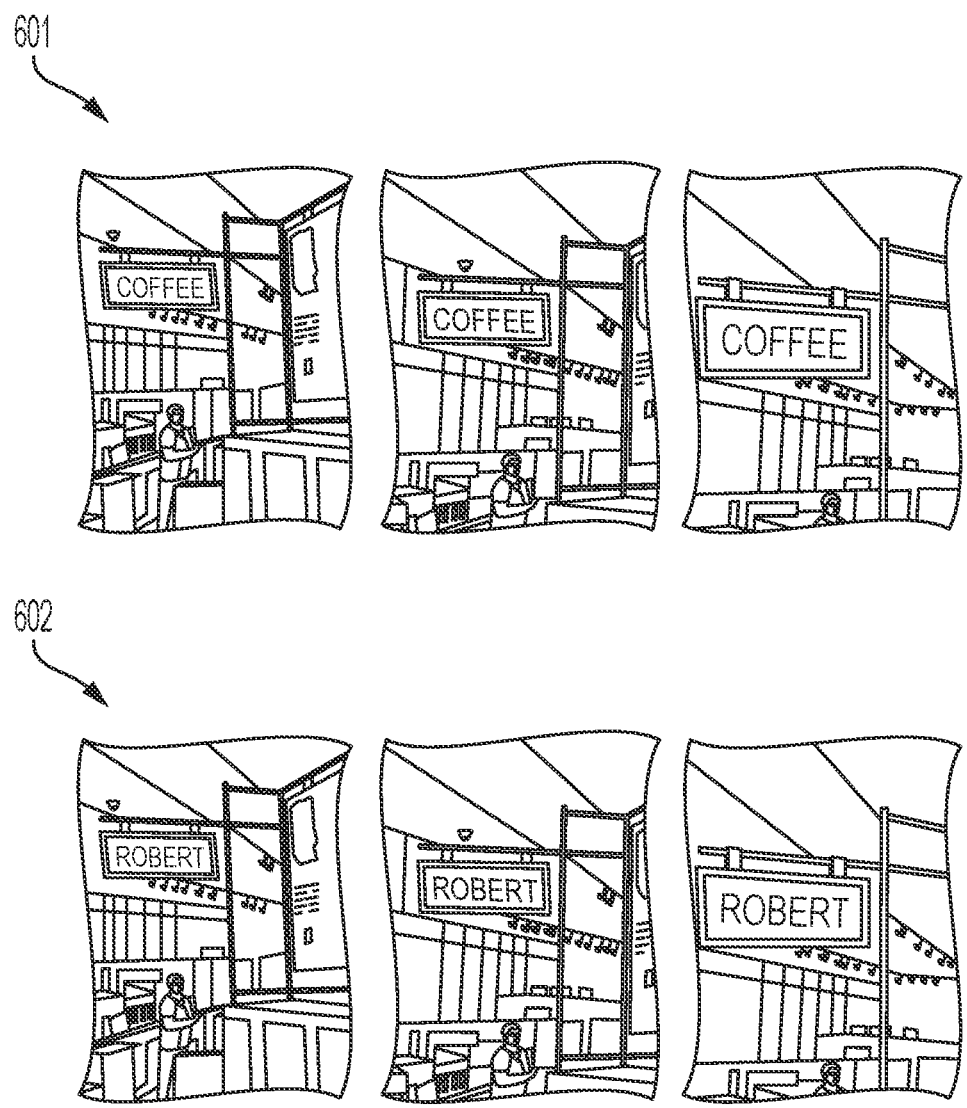
FIG. 6 compares example images, before and after processing, using the methods described in this document.

FIG. 6 illustrates example applications of the methods described in this document to actual images. In particular, FIG. 6 illustrates an example comparison of an original image sequence 601 that includes scene text (the word "coffee") and a modified image sequence 602 in which the scene text has been replaced (with the word "robert") using the methods described above.

The description above explains that the processes of this document may apply to text, which is defined about. However, in additional embodiments the same processes may be applied to alter, or remove and replace, other objects in an image. Object may include, for example, vehicles, people, animals, buildings, signs (including both text and the substrate on which text is printed) or any other object that appears in a picture. The object may be detected by any classifier (i.e., a machine learning model such as an artificial neural network that has been trained on a set of training images which have been labeled with objects that appear in the images). Alternatively, the object may be identified via a human operating a user interface, such as an interface that defines a bounding box around the object and receives a label for the object.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, personal digital assistants, cameras, tablet computers, laptop computers, media players and the like. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "computer-readable medium," "memory," "memory device," "data store," "data storage facility," and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A "computer program product" is a computer-readable medium with programming instructions stored thereon.

The terms "machine learning model" or "model" refers to a set of algorithmic routines and parameters that can predict an output(s) of a real-world process (e.g., replacement of scene text) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology. Example machine learning models include neural networks such as convolutional neural networks (CNNs), generative adversarial networks (GANs), and other trained networks that exhibit artificial intelligence.

The term "bounding box" refers to a rectangular box that represents the location of an object. A bounding box may be represented in data by x- and y-axis coordinates $[x_{max}, y_{max}]$ that correspond to a first corner of the box (such as the upper right corner), along with x- and y-axis coordinates $[x_{min}, y_{min}]$ that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A digital image frame editing method comprising, by a processor:
    receiving a video comprising a sequence of digital image frames;
    processing the digital image frames to define a region of interest (ROI) that contains original text in each of the digital image frames;
    using the ROIs of the digital image frames to select a reference frame from the sequence of digital image frames;
    replacing the original text in the ROI of the reference frame with replacement text by inserting a modified reference frame ROI in the reference frame;
    selecting a target frame from the sequence of digital image frames, wherein the target frame is a digital image frame of the video that is different from the reference frame;
    determining a transform function between the ROI of the reference frame and the ROI of the target frame;
    using the transform function to transform the modified reference frame ROI to a modified target frame ROI in which the original text is replaced with the replacement text; and
    inserting the modified target frame ROI into the target frame to produce a modified target frame in the sequence of digital image frames.

2. The method of claim 1, further comprising, for each of a plurality of additional target frames in the sequence of digital image frames:
    determining an additional transform function between the reference frame ROI and the ROI of the additional target frame;
    using the additional transform function to transform the modified reference frame ROI to a modified additional target frame ROI in which the original text is replaced with the replacement text; and
    inserting the modified additional target frame ROI into the additional target frame to produce a modified additional target frame in the sequence of digital image frames.

3. The method of claim 1, in which using the ROIs to select the reference frame comprises analyzing the sequence of digital image frames to select a frame in which the original text satisfies a function of one or more of the following criteria: a threshold optical character recognition confidence score; a sharpness criterion; a size criterion; a contrast criterion; or a pose criterion.

4. The method of claim 1, wherein determining the transform function between the reference frame ROI and the target frame ROI comprises determining at least two of the following:
    a lighting correction transform element, which comprises a function that represents changes in illumination between the reference frame ROI and the target frame ROI;
    a sharpness transform element, which comprises a function that represents differences in camera focus, capture resolution, or both between the reference frame ROI and the target frame ROI; or
    a motion blur transform element, which comprises a function that represents differences in motion blur between the reference frame ROI and the target frame ROI.

5. The method of claim 4, wherein determining the lighting correction transform element, the sharpness transform element, and/or the motion blur transform element comprises training a machine learning model using training samples comprising pairs of reference frames and target frames.

6. The method of claim 5, wherein using the transform function to transform the modified reference frame ROI to the modified target frame ROI comprises applying the determined transform elements to the modified reference frame ROI to yield the modified target frame ROI.

7. The method of claim 2 further comprising, before using the transform function to transform any of the target frame ROIs, normalizing and aligning the original text in the ROIs for each of the target frames to a consistent pose.

8. The method of claim 1, in which replacing the original text in the reference frame ROI with replacement text to yield the modified reference frame ROI comprises:
    processing the ROI of the reference frame through a multitask machine learning model to determine a foreground image of the ROI, a background image of the ROI, and a binary mask that distinguishes foreground image pixels from background image pixels in the ROI;
    receiving a new binary mask that contains replacement text; and
    applying the new binary mask to blend the background image with the foreground image and yield a modified reference frame ROI.

9. The method of claim 1, wherein processing the digital image frames to define the ROI in each frame comprises:

applying a text detector to each of the digital image frames to return bounding box coordinates; and defining the ROIs of each of the digital image frames according to the bounding box coordinates.

10. A system for editing digital image frames, the system comprising:
a processor; and
a memory device containing programming instructions that are configured to cause the processor to:
receive a video comprising a sequence of digital image frames,
process the digital image frames to define a region of interest (ROI) that contains original text in each of the digital image frames,
use the ROIs of the digital image frames to select a reference frame from the sequence of digital image frames,
replace the original text in the ROI of the reference frame with replacement text by inserting a modified reference frame ROI in the reference frame,
select a target frame from the sequence of digital image frames, wherein the target frame is a digital image frame of the video that is different from the reference frame;
determine a transform function between the ROI of the reference frame and the ROI of the target frame,
use the transform function to transform the modified reference frame ROI to a modified target frame ROI in which the original text is replaced with the replacement text, and
insert the modified target frame ROI into the target frame to produce a modified target frame in the sequence of digital image frames.

11. The system of claim 10, further comprising additional programming instructions to, for each of a plurality of additional target frames in the sequence of digital image frames:
determine an additional transform function between the reference frame ROI and the ROI of the additional target frame;
use the additional transform function to transform the modified reference frame ROI to a modified additional target frame ROI in which the original text is replaced with the replacement text; and
insert the modified additional target frame ROI into the additional target frame to produce a modified additional target frame in the sequence of digital image frames.

12. The system of claim 10, in which the instructions to use the ROIs to select the reference frame comprise instructions to analyze the digital image frames of the sequence of digital image frames to select a frame in which the original text satisfies a function of one or more of the following criteria: a threshold optical character recognition confidence score; a sharpness criterion; a size criterion; a contrast criterion; or a pose criterion.

13. The system of claim 10, wherein the instructions to determine the transform function between the reference frame ROI and the target frame ROI comprise instructions to determine at least two of the following:
a lighting correction transform element, which comprises a function that represents changes in illumination between the reference frame ROI and the target frame ROI;
a sharpness transform element, which comprises a function that represents differences in camera focus, capture resolution, or both between the reference frame ROI and the target frame ROI; or a motion blur transform element, which comprises a function that represents differences in motion blur between the reference frame ROI and the target frame ROI.

14. The system of claim 13, wherein the instructions to determine the lighting correction transform element, the sharpness transform element, and/or the motion blur transform element comprise instructions to train a machine learning model using training samples comprising pairs of reference frames and target frames.

15. The system of claim 14, wherein the instructions to use the transform function to transform the modified reference frame ROI to the modified target frame ROI comprise instructions to apply the determined transform elements to the modified reference frame ROI to yield the modified target frame ROI.

16. The system of claim 10 further comprising additional programming instructions that are configured to cause the processor to, before using the transform function to transform any of the target frame ROIs, normalize and align the original text in the ROIs for each of the target frames to a consistent pose.

17. The system of claim 10, wherein the programming instructions to replace the original text in the reference frame ROI with replacement text to yield the modified reference frame ROI comprise instructions to:
process the ROI of the reference frame through a multi-task machine learning model to determine a foreground image of the ROI, a background image of the ROI, and a binary mask that distinguishes foreground image pixels from background image pixels in the ROI;
receive a new binary mask that contains replacement text; and
apply the new binary mask to blend the background image with the foreground image and yield a modified reference frame ROI.

18. The system of claim 10, wherein the instructions to process the digital image frames to define the ROI in each frame comprise instructions to:
apply a text detector to each of the digital image frames of the sequence to return bounding box coordinates; and
define the ROIs of each of the digital image frames according to the bounding box coordinates.

19. A computer program product comprising a computer-readable medium containing programming instructions that are configured to cause the processor to:
receive a video comprising a sequence of digital image frames;
process the digital image frames to define a region of interest (ROI) that contains original text in each of the digital image frames;
use the ROIs of the digital image frames to select a reference frame from the sequence of digital image frames;
replace the original text in the ROI of the reference frame with replacement text by inserting a modified reference frame ROI in the reference frame;
select a target frame from the sequence of digital image frames, wherein the target frame is a digital image frame of the video that is different from the reference frame;
determine a transform function between the ROI of the reference frame and the ROI of the target frame;

use the transform function to transform the modified reference frame ROI to a modified target frame ROI in which the original text is replaced with the replacement text; and insert the modified target frame ROI into the target frame to produce a modified target frame in the sequence of digital image frames.

20. The computer program product of claim 19, further comprising additional programming instructions to, for each of a plurality of additional target frames in the sequence of digital image frames:

determine an additional transform function between the reference frame ROI and the ROI of the additional target frame; and use the additional transform function to transform the modified reference frame ROI to a modified additional target frame ROI in which the original text is replaced with the replacement text.

21. A digital image frame editing method comprising, by a processor:

receiving a video comprising a sequence of digital image frames;

processing the digital image frames to define a region of interest (ROI) that includes an object in each of the digital image frames;

using the ROIs of the digital image frames to select a reference frame from the sequence of digital image frames;

replacing the object in the ROI of the reference frame with a replacement object by inserting a modified reference frame ROI in the reference frame;

selecting a target frame from the sequence of digital image frames, wherein the target frame is different from the reference frame;

determining a transform function between the ROI of the reference frame and the ROI of the target frame;

using the transform function to transform the modified reference frame ROI to a modified target frame ROI in which the object is replaced with the replacement object; and inserting the modified target frame ROI into the target frame to produce a modified target frame in the sequence of digital image frames.

\* \* \* \* \*